Figure 1B:
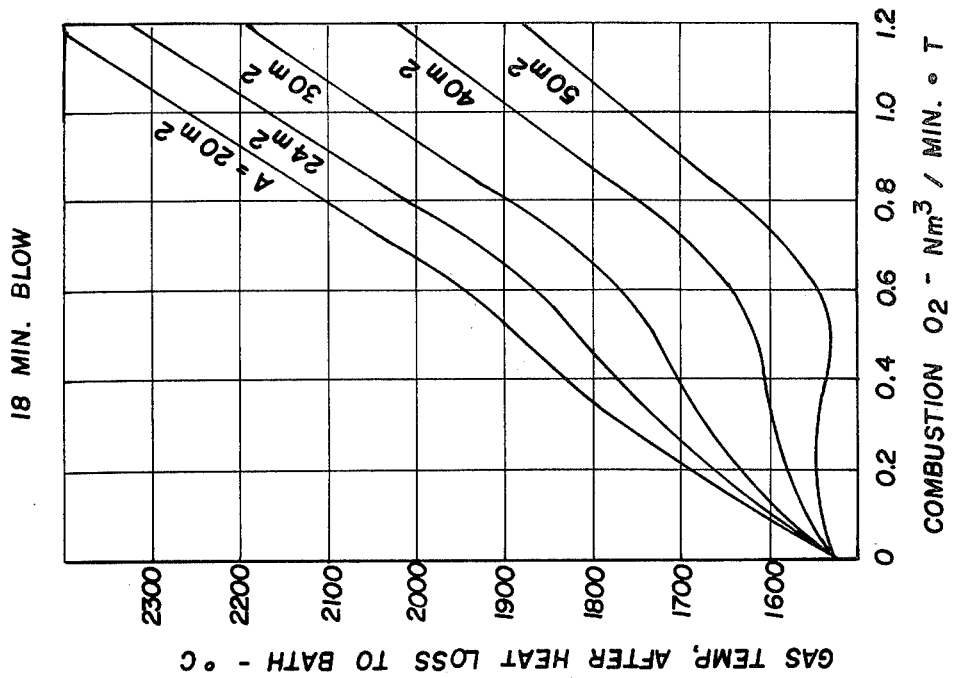

United States Patent [19]

Slamar

[11] 4,201,572

[45] May 6, 1980

[54] METHOD FOR INCREASING THE SCRAP MELTING CAPABILITY OF BOTTOM BLOWN PROCESSES

[75] Inventor: Frank Slamar, Pittsburgh, Pa.

[73] Assignee: United States Steel Corporation, Pittsburgh, Pa.

[21] Appl. No.: 930,441

[22] Filed: Aug. 2, 1978

[51] Int. Cl.² ............................................. C21C 5/34
[52] U.S. Cl. ....................................................... 75/60
[58] Field of Search ..................................... 75/60, 59

[56] References Cited

U.S. PATENT DOCUMENTS

| | | | |
|---|---|---|---|
| 3,953,199 | 4/1976 | Michaelis | 75/60 |
| 3,970,446 | 7/1976 | Kolb | 75/60 |
| 3,997,335 | 12/1976 | Kolb | 75/60 |
| 4,047,936 | 9/1977 | Chang | 75/60 |
| 4,047,937 | 9/1977 | Kolb | 75/60 |

Primary Examiner—P. D. Rosenberg

Attorney, Agent, or Firm—Arthur J. Greif

[57] ABSTRACT

In the bottom blown process for the refining of molten steel, additional heat is generated for melting greater amounts of scrap, by injecting at least one secondary stream of an oxygen-containing gas to the space above the molten metal bath so as to combust the CO and $H_2$ evolving therefrom. The excess heat so generated is absorbed both by the bath and the furnace lining, causing overheating and rapid deterioration of the lining. For a given quantum of heat so generated the ability of the molten metal to absorb a greater portion of that heat and thereby maintain the temperature of the furnace lining within the practical limits has been found to depend to a significant extent on the design of the furnace itself. The invention is directed to conducting the refining process in vessels which provide, for a given bath capacity, greater top surface areas than has heretofore been employed.

10 Claims, 6 Drawing Figures

METHOD FOR INCREASING THE SCRAP MELTING CAPABILITY OF BOTTOM BLOWN PROCESSES

This invention relates to the refining of metals by any of the bottom-blown pneumatic processes, Bessemer, Q-BOP, etc., and is specifically directed to a method for enhancing the scrap melting capability of such processes, as they relate to the refining of molten metals by the oxidation of carbonaceous impurities therein, particularly as to the refining of pig iron.

The advent of modern pneumatic steelmaking processes, such as the BOP and the Q-BOP, permitted the production of steels with high quality, while reducing the refining period to only a fraction of the time required in the open-hearth process. One of the disadvantages of these newly developed pneumatic steelmaking processes, in comparison with that of the open-hearth process, is their inability to utilize the large amounts of scrap which could be melted in the latter. The necessity for enhancing the scrap melting capability of a furnace will depend to a great extent on external factors, such as (i) the cost of scrap versus that of hot metal and (ii) the availability of such hot metal—many mills being production limited in their hot metal capacity. Where increased scrap melting is of importance, it has been proposed to preheat the scrap, either within the converter itself or in a separate furnace prior to charging into the refining converter. Obviously, both capital costs and operating costs will significantly be increased if such preheating procedures are employed.

A less costly solution consists of increasing the temperature within the converter by the burning of suitable fuels to generate additional heat above the surface of the metal bath. The most available fuel for this purpose is the carbon monoxide evolved from the bath itself, as a result of the oxidation of carbon. Thus, more heat per mol may be generated by such after combustion of carbon monoxide to carbon dioxide, than can be generated by the combustion of carbon to carbon monoxide. Because CO is such a good fuel, rotary-type steelmaking processes such as the Kaldo process and the Rotor process have made good use of this after-combustion of carbon monoxide. The successful utilization of this principle in such processes has been made possible by their ability, as a result of furnace rotation, to absorb the intense heat so generated into the molten steel itself, thereby preventing overheating of the refractory lining. Generally, when CO is combusted above the metal bath, only a small fraction of the heat generated will be absorbed by the bath—a very significant fraction of the heat being transmitted to the furnace lining, causing overheating and deterioration of the lining. However, when the furnace is rotated about an approximately horizontal axis, the molten metal bath is caused to contact virtually all portions of the furnace lining, thereby cooling the lining by absorbing the heat therefrom. While such rotary-type processes prevent, at least to some extent, deterioration of the lining from overheating, severe lining wear nevertheless results, due to attack of the slag and erosion by the friction of the metal bath. Equally important, considerable difficulties arose from the necessarily complicated apparatus required for achieving such rotation.

The principal of after-combustion of carbon monoxide has also been proposed for use in stationary-type furnaces, and more particularly, for bottom-blown furnaces such as in U.S. Pat. Nos. 3,839,017 and 4,047,936. Obviously, if such after-combustion were to be employed in a stationary bottom-blown furnace, provision must be made to decrease the amount of heat absorbed by the exposed lining above the bath surface, so as to prevent its rapid deterioration. In this regard, proposals have been made, with varying degrees of success, to increase the fraction of heat absorbed by the bath by (i) modifying the angle and velocity of injection of the secondary streams of oxygen, (ii) closer placement of the secondary oxygen tuyeres to the surface of the bath, and (iii) varying the ratio of the amount of oxygen directed to the primary jets, i.e. those below the surface of the bath, to that of the secondary jets, those above the bath surface.

It has been found, however, while such measures can increase the scrap melting capability of the refining process, such increase is primarily due to the achievement of higher temperatures generated by the after-combustion process—with the undesirable result that such higher temperatures are concomitantly absorbed by the furnace lining. It was also found in employing after-combustion of CO in two furnaces of varying design and significantly different capacity, while maintaining the furnace lining within acceptable temperature limits and utilizing similar measures (i.e. those noted as i, ii, iii above) that the smaller furnace provided significantly greater scrap melting capability. Analysis of those runs lead to the finding that the parameter most responsible for this difference in scrap melting capability was the fact that the smaller furnace, as a result of design differences, provided a molten bath with a greater top surface area per unit weight of metal bath. It was thereafter determined, for a given gas temperature (produced by after-combustion of CO) above the surface of the bath, that the ability of the furnace lining to reflect a greater portion of that heat to the bath itself could be achieved by employing furnace designs which provided baths with top surface areas greater than heretofore had been employed in non-rotary type furnaces. Virtually all BOP or Q-BOP type furnaces are, in a sense, rotatable so as to permit material to be charged into the furnace and refined molten metal to be tapped therefrom. It should therefore be understood that the term "non-rotary furnace process" as used herein, relates to processes in which the vessel is not rotated or revolved during the actual refining procedure, to enable the moten metal to contact varying portions of the furnace lining to remove excess heat therefrom. By way of explanation, "rotary-type" processes are those in which the vessel is rotated during at least a major portion of the refining period. Examples of the latter are the Kaldo process, the Rotor process, or those in which the vessel is revolved around its vertical axis, e.g. U.S. Pat. No. 3,793,001.

Figure 2B:
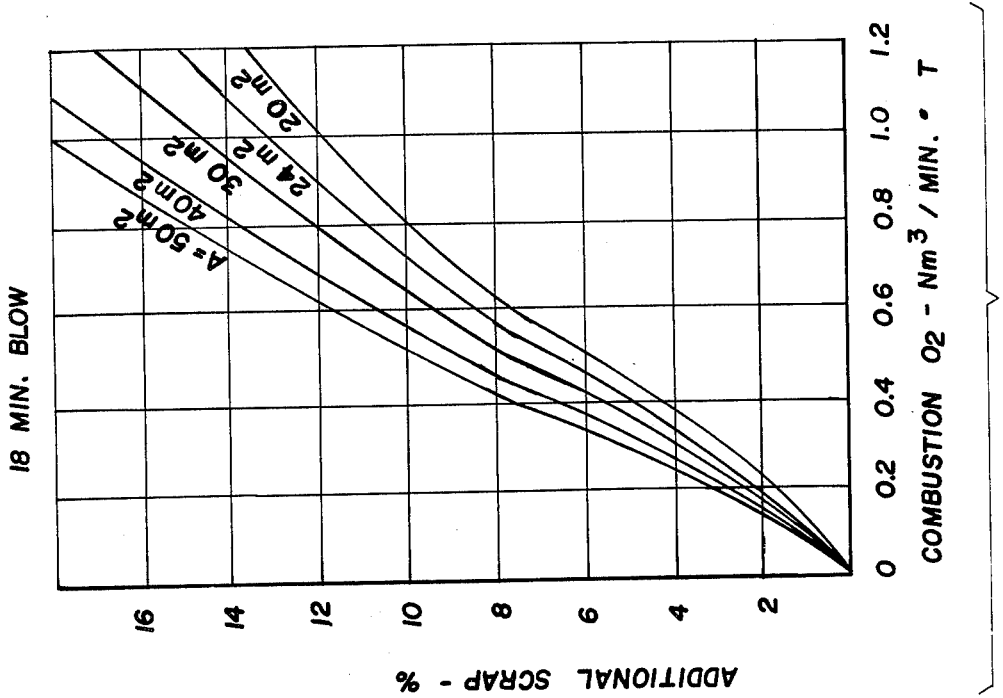
Figure 2A:
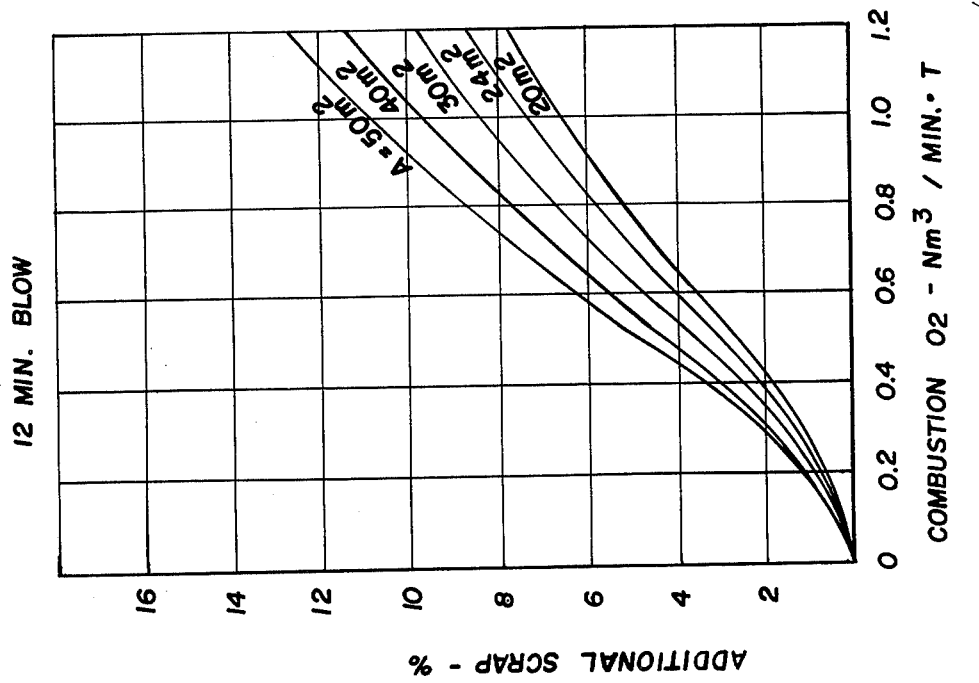
Figure 3:
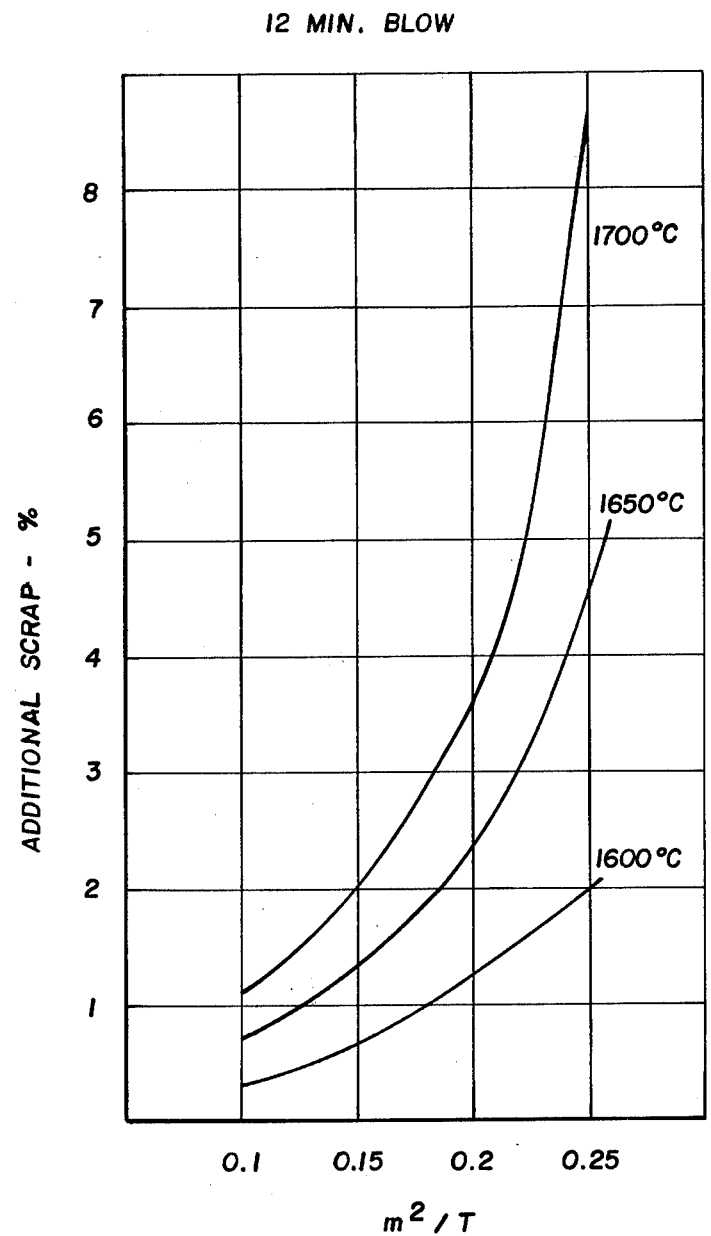
Figure 4:
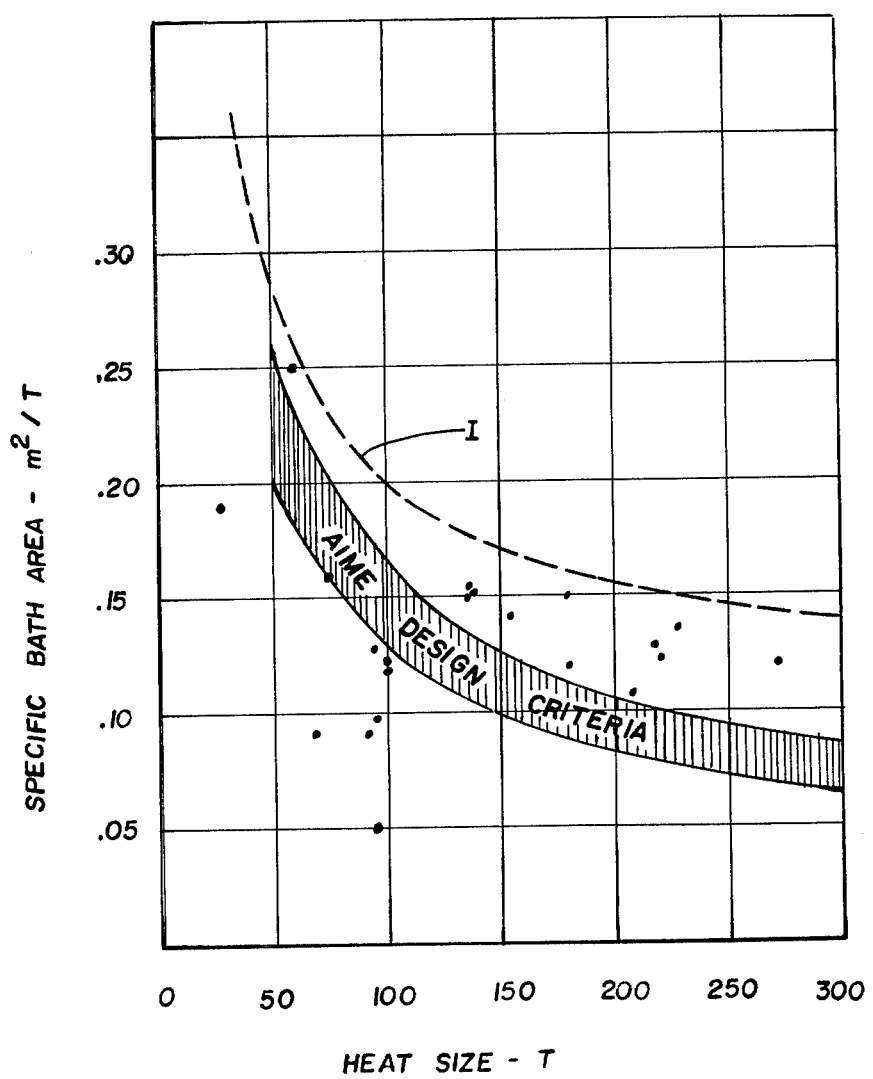

It is therefore a principle object of the instant invention to provide enhanced scrap melting capability in bottom-blown processes for refining molten metal, wherein the after-combustion of carbon monoxide by secondary oxygen jets is utilized to its fullest advantage, while preventing serious overheating of the furnace lining. This and other objects and advantages of the instant invention will become more apparent from a reading of the following description when taken in conjunction with the appended claims and the drawings, in which:

FIG. 1 shows the gas temperature after heat transfer to the bath as a function of "combustion oxygen" and the top surface area of a 200 metric ton heat, FIG. 2 shows the amounts of additional scrap that can be melted in a 200 metric ton heat as a function of "combustion oxygen" and the top surface area of the bath, FIG. 3 shows, for a variety of furnaces, the amount of additional scrap that can be melted as a function of the top surface area of the bath, for three practical (in terms of presently available furnace linings) gas temperatures after heat loss to the bath, and FIG. 4 shows "specific bath area" as a function of furnace capacity, (i) utilizing AIME design criteria and (ii) typical values encountered in actual commerical practice.

A series of experiments were performed in two Q-BOP vessels having a nominal capacity, respectively, of 30 and 200 metric tons. The Q-BOP process, as used herein, is one in which the primary oxygen-containing gas is injected through tuyeres located at the bottom of the vessel, and in which the oxygen-containing stream is surrounded by a protective, hydrocarbon containing shield fluid. Both vessels were fitted with side tuyeres for the injection of secondary oxygen jets above the moten bath so as to generate additional heat and melt additional scrap. In the runs utilizing the 30-ton vessel, 3,500 scfm of primary oxygen was injected through the bottom tuyeres, while 700 scfm of secondary oxygen was injected through the side tuyeres. The average blow time for these runs was 13 minutes and the equilibrium gas temperatures after heat loss to the bath and to the furnace lining was determined to be 1650° C. From data derived during these tests it was calculated that of the 700 scfm secondary oxygen so injected, about 47% or 330 scfm of oxygen functioned as "combustion oxygen". "Combustion oxygen" is that portion of the secondary oxygen actually utilized in burning combustibles (primarily CO and $H_2$) in the vessel gas—the balance of the secondary oxygen so injected being absorbed by the bath and utilized for the oxidation of impurities therein. In employing the parameters above, an average of 2.2% of additional scrap was melted in these runs, over the amount of scrap melted in which no secondary oxygen was injected. Substantially the same procedures were employed in tests in the 200 metric ton vessel. Of course, due to the size difference, 24,000 scfm of primary oxygen was injected through the bottom tuyeres and 4,400 scfm of secondary oxygen was injected through the side tuyeres above the surface of the bath. These injection rates resulted in a slightly faster blow time, the duration of which averaged 12 minutes. Equilibrium gas temperature above the surface of the bath was determined to be 1640° C. It was therefore calculated that of the 4,400 scfm secondary oxygen so injected, about 32% or 1420 scfm was utilized as "combustion oxygen". In runs in this larger furnace, an average of only 0.9% additional scrap was melted, over that in which after-combustion of CO was not utilized. A variety of expedients, well known to the art, are often utilized to enhance scrap melting capability. For example, procedures such as (i) continuous firing of bottom tuyeres can be employed to keep the furnace from cooling and (ii) oxygen rather than nitrogen can be utilized for turns-downs again to maintain a higher bath temperature. As noted above, the expedients utilized were the same for both the 30-ton and 200-ton furnaces. The equilibrium gas temperatures achieved as a result of the injection of secondary oxygen were also quite similar for both furnaces. Nevertheless, the various runs in the 30-ton furnace provided an enhanced scrap-melting capability, averaging more than twice that of the 200-ton furnace.

Figure 1A:
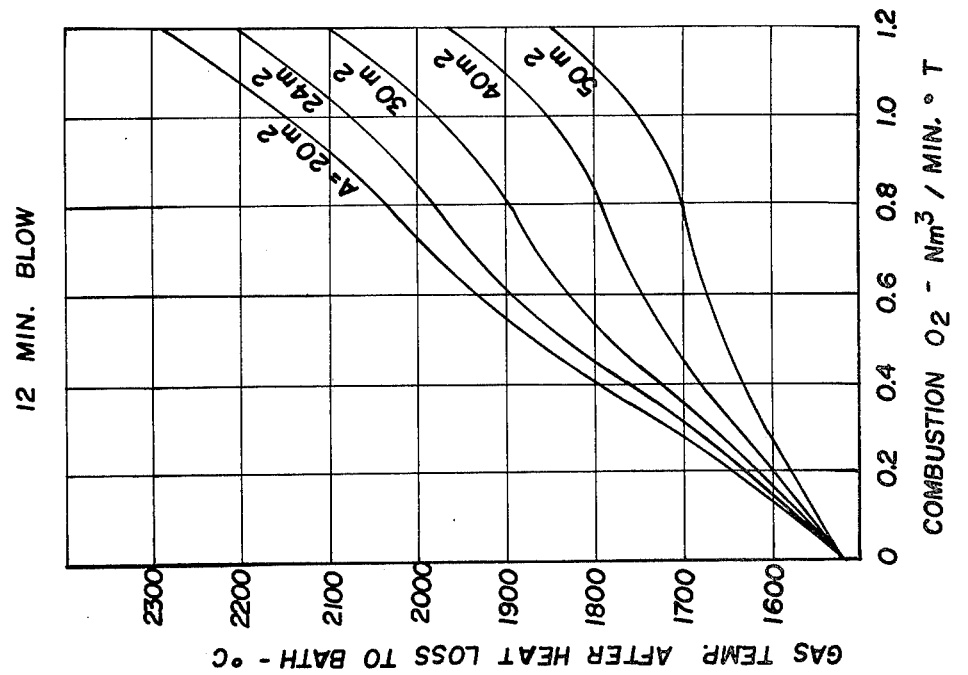

An analytical study was therefore conducted to determine the dominating system parameters which resulted in this marked difference in scrap melting capability. The solution to this problem requires the determination of two basic items—the heat generated by the oxidation of CO (or any other combustible) and the heat transferred to the bath. The heat generated by combustion is a straight-forward calculation involving gas compositions, flow rates and heats of reaction. The heat transferred to the bath is not as easily determined. However, since the flame temperatures of the burned gases are high compared to the bath temperature, certain simplifying assumptions could be made as to the predominant heat transfer mechanisms. On this basis, several functions were developed that related the system variables. Surprisingly, it was found that although the various known expendients such as changing (1) the angle or velocity of the secondary jets or (2the placement of the secondary tuyeres, both of which are employed to expose more or less $O_2$ to the space immediately above the surface of the bath, or (3) changing the ratio of the amount of secondary oxygen to the amount of primary oxygen, the distribution of which generally varies from 15% secondary and 85% primary to 50% secondary and 50% primary, will have a pronounced effect on "combustion oxygen"; if "combustion oxygen" is considered as an independent variable, the functional relationships which are thereby developed lead to the finding that the most significant factor in imparting heat to the bath, while preventing overheating of the refractory lining, is the design of the vessel itself, i.e. the amount of surface area provided by the vessel for a bath of given mass. Certain of the relationships which were developed are displayed in graphical form in FIGS. 1 through 3. FIG. 1 shows the gas temperature after heat transfer to a 200-metric ton bath as a function of "combustion oxygen" and the top surface area of the bath—FIG. 1a shows the equilibrium gas temperatures resulting from a 12-minute blow, and FIG. 1b shows these temperatures during an 18-minute blow. FIG. 2 shows the amount of additional scrap that can be melted in a 200-metric ton heat as a function of "combustion oxygen" and the top surface area of the bath for both a 12-minute blow (FIG. 2a) and for an 18-minute blow (FIG. 2b). It may readily be seen from the above, for any specific value of "combustion oxygen" which value may be varied in known manner, as indicated above, that the scrap melting capability of a metal refining process may be enhanced by either (i) modifying the furnace design to provide for an increased top surface area of the bath and/or (ii) utilizing a longer blowing time. Utilization of the latter expedient, however, will be somewhat self-defeating in that the cost benefits achieved from greater scrap melting capability would be at the expense of decreased production—with its attendant higher costs.

The effect of top surface area of scrap melting capability is more dramatically illustrated in FIG. 3 which is not limited to a specific bath size and presents, at three different gas temperatures, the amount of additional scrap which may be melted as a function of the specific bath area, where "specific bath area" is the top surface area of a quiescent bath, in square meters, $m^2$, divided by the mass, in metric tons, T, of liquid metal in the bath prior to tap. This mass will, for purposes of approximation, be about 0.9 times the amount of metallics (hot metal and scrap) charged to the vessel—assuming a yield of 90%. The significance of gas temperature after heat loss to the bath is primarily the effect of these temperatures on the refractory lining of the vessel. For practical purposes, this temperature will generally be limited to the range 1600° to 1700° C. shown in this figure. Referring to FIG. 3, it now becomes quite evident why the 30-ton vessel yielded additional scrap melting, more than twice that achieved by the 200-ton vessel. In calculating the specific bath area of these two furnaces, it was found, as a result of design of these vessels, that the 200-ton vessel had a specific bath area of only 0.12 m$^2$/T, while the 30-vessel had a specific bath area of 0.195 m$^2$/T. Even here, however, if we assume that a gas temperature of 1650° C. is a practical limit for a furnace lining, it is seen that the scrap melting capability of the 30-ton furnace could have been dramatically increased by utilizing a design for a furnace of this size which would have provided a specific bath area of, for example, 0.25 m$^2$/T. Thus, a furnace which provided the latter specific bath area could have melted about 4.5 percent additional scrap, while maintaining the temperatures of the furnace lining within the same 1650° C. limit.

Utilizing the concepts of the instant invention, increased scrap melting capability can be achieved in a furnace of any size. However, the most dramatic benefits will be realized in furnaces having a capacity in excess of about 125 metric tons, since furnaces in this size generally provide specific bath areas (see FIG. 4) well below 0.175 m$^2$/T. Referring again to FIG. 3, it may be seen that at a specific bath area of about 0.175 m$^2$/T, scrap melting capability increases much more rapidly with an increase in specific area for both the 1650° C. and 1700° C. curves. Smaller furnaces, inherently, as a result of their design features, normally provide operation within this range, but offer less productive capacity. To maintain productive capacity while achieving high rates of scrap melting, it is therefore desirable (i) to utilize furnaces having nominal capacities of from 125 to 300 metric tons, which furnaces would be designed to provide a "specific bath area" of at least 0.175 m$^2$/T, and preferably greater than 0.2 m$^2$/T, and (ii) to charge such furnaces with sufficient metallics so as to utilize at least 80% of nominal furnace capacity, and preferably sufficient to utilize at least 95% of the nominal furnace capacity.

For any given size furnace, specific bath areas will be found to vary widely in commercial application. Utilizing generally accepted design criteria this value does, as noted above, tend to increase as the furnace capacity decreases. For example, FIG. 4 shows the variation of specific bath area with furnace size, for (i) furnaces designed in accord with the specifications of the AIME Design Guide (the shaded curve) and (ii) typical values of vessels in commercial operation (indicated by circles). It is seen, therefore, that within the nominal size range of 25 to 300 tons, the "specific bath areas" of such vessels fall well below Curve I, which is defined by the equation:

Specific Bath Area = 9/T + 0.11     (I)

It should be understood, however, that Curve I is by no means an upper limit and furnaces may, of course, be designed to provide significantly greater "specific bath areas". The instant invention, it its broadest sense, is therefore directed to utilization of after-combustion in the refining of molten metals in non-rotary processes, wherein the top surface area, A, of the bath will be that resulting from use of a vessel having a "specific bath area" greater than defined by Curve I in FIG. 4. Since specific bath area is A/T, the top surface area of the bath should thus be greater than that defined by:

$$A = 9 + 0.11T \tag{II}$$

where A is the top surface, in square meters, of the quiescent bath and T is the mass, in metric tons, of molten metal in said bath prior to tap. However, it will generally be desirable to employ baths having surface areas significantly greater than that prescribed by equation II—particularly with respect to bath sizes for which this invention provides the greater benefits, i.e. those of the order of 125 to 250 metric tons. It will therefore be preferable that the top surface area of such baths be greater than 9 + 0.14T.

I claim:

1. A non-rotary furnace process for the manufacture of refined molten metals from a charge comprising carbon-containing molten metal and solid metal scrap, wherein at least one primary stream of free-oxygen containing refining gas is injected into the vessel below the surface of a molten metal bath to be refined therein, and at least one secondary stream of a free-oxygen containing gas is injected into the vessel above the bath surface so as to combust within the vessel at least a portion of the carbon monoxide evolved from the bath during the refining thereof and to impart to the bath thermal energy released by such combustion, the improvement for enhancing the scrap-melting capability of the process within the operating temperature tolerance range of the refractory lining which comprises conducting the refining and scrap melting in a bath having a surface area, A, greater than that defined by the equation:

$$A = 9 + 0.11T$$

where A is the top surface area, in square meters, of the quiescent molten metal bath, and T is the mass, in metric tons, of the bath.

2. The process of claim 1, wherein the temperature tolerance range of the furnace lining is 1600° to 1700° C.

3. The process of claim 1 or 2 wherein said vessel has a nominal capacity of 125 to 300 metric tons, and said charge contains sufficient metallics to utilize at least 80% of the nominal capacity thereof.

4. The process of claim 3 wherein said charge contains sufficient metallics to utilize at least 95% of the capacity thereof.

5. The process of claim 3 wherein the furnace lining is kept within said tolerance range by maintaining the temperature of the gases resulting from said combustion at a temperature of about 1650° to 1700° C., after heat loss to the bath and the furnace lining.

6. The process of claim 5 wherein said gas temperatures are maintained within said range by varying the amount of "combustion oxygen" resulting from the injection of said secondary oxygen containing gas.

7. The process of claim 2 wherein said process is a Q-BOP process and said molten metal is steel.

8. The process of claim 3 wherein said process is a Q-BOP process and said molten metal is steel.

9. The process of claim 7 wherein the mass of steel is within the range 125 to 250 tons and said surface area is greater than 9+0.14T.

10. The process of claim 3 wherein the mass of steel is within the range 125 to 250 tons and said surface area is greater than 9+0.14T.

* * * * *

UNITED STATES PATENT AND TRADEMARK OFFICE
CERTIFICATE OF CORRECTION

PATENT NO. : 4,201,572
DATED : May 6, 1980
INVENTOR(S) : Frank Slamar

It is certified that error appears in the above-identified patent and that said Letters Patent are hereby corrected as shown below:

Claim 1, line 25, column 6,

"A non-rotary furnace process for the manufacture of refined molten metals from a charge..." should read -- A non-rotary furnace process for the manufacture of refined molten metals from a bath... --.

Signed and Sealed this

Seventh Day of October 1980

[SEAL]

*Attest:*

SIDNEY A. DIAMOND

*Attesting Officer*  *Commissioner of Patents and Trademarks*